Jan. 26, 1954

C. M. FRYE ET AL 2,667,348

RESILIENT TELESCOPIC DEVICE

Filed Feb. 5, 1952

INVENTORS

COLIN MICHAEL FRYE
FREDERICK EDWARD KILLMER
ARTHUR KENNETH MORRIS

Reynolds, Beach + Christensen

ATTORNEYS

Patented Jan. 26, 1954

2,667,348

UNITED STATES PATENT OFFICE 2,667,348

RESILIENT TELESCOPIC DEVICE

Colin M. Frye, Longlevens, Frederick E. Killner, Prestbury, and Arthur K. Morris, Tewkesbury, England, assignors to Dowty Equipment Limited, Cheltenham, England Application February 5, 1952, Serial No. 269,968

13 Claims. (Cl. 267—64)

There is a resilient telescopic device, known as a liquid spring, in which a plunger is reciprocable through a packing gland at one end of a chamber or cylinder containing liquid filling the maximum available space within the cylinder, so that during contraction of the device the liquid is compressed by the increasing plunger volume received within the cylinder. Recoil or extension of the device is brought about by the restoring forces of the compressed liquid. Provision is usually made for energy dissipation or damping, at least during recoil, and this may be afforded by causing the entrapped liquid to flow through one or more relief valves or orifices which may be formed in a piston or damping head carried by the plunger. Devices of this kind form the subjects of United States Letters Patents to George H. Dowty, Numbers 2,333,095 and 2,346,667.

The present invention has arisen from the realisation, in conjunction with devices of the type disclosed in the patent to Bingham, No. 2,308,149, of January 12, 1943, which was designed for aircraft use, that special sealing problems are involved when liquid spring telescopic resilient devices are used in a land vehicle suspension system (for automobiles, for example), in which the devices have to serve at all times, and not only occasionally, to support the sprung load of the vehicle, and, in particular, have to withstand long periods of continuous operation during the vehicle's travel. The sealing means for preventing escape of liquid from the cylinder must be capable of withstanding the high pressures developed during the compressive strokes, yet must avoid scoring or otherwise damaging the surface of the plunger. Both factors must be present if the devices are to be capable of giving satisfactory service throughout a reasonably long life, and the object of the invention is to provide improved devices wherein the liquid in the cylinder is maintained in volumetric capacity and at an elevated pressure, throughout continued working, without the provision of auxiliary pressurising means.

Figure 1:
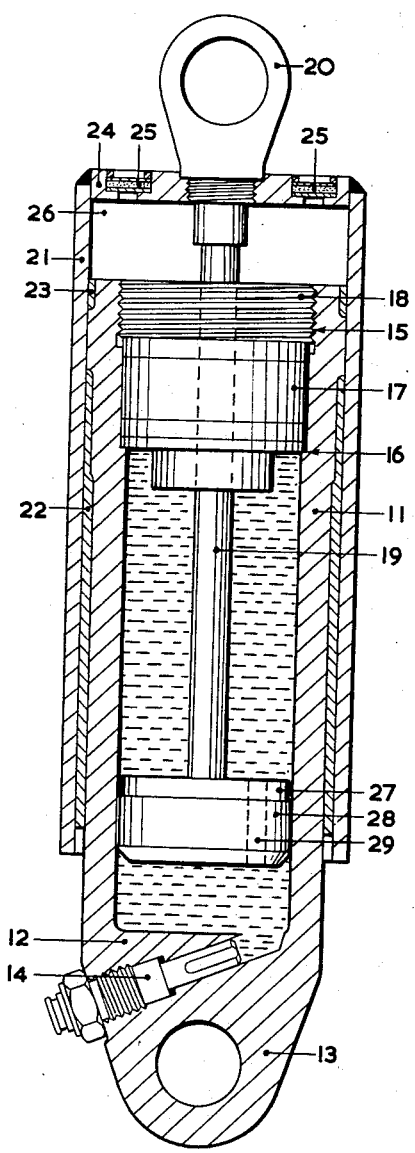
Figure 2:
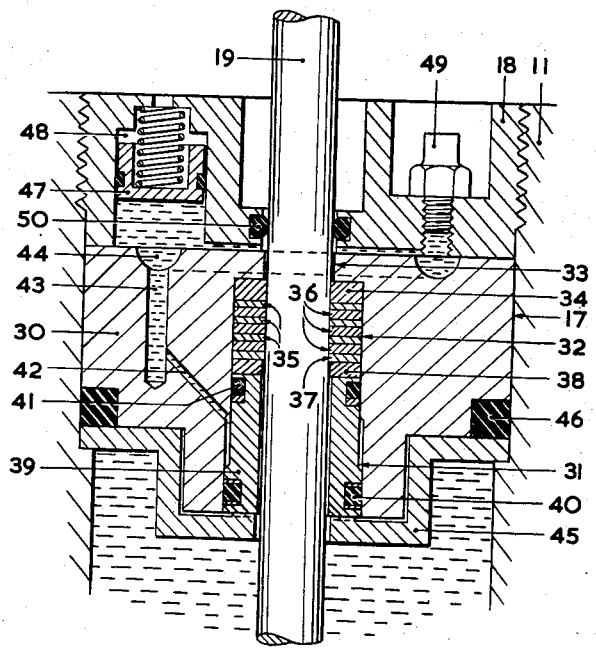

A liquid spring type resilient telescopic device constructed in accordance with the preferred embodiment of the invention and suitable for use in a land vehicle suspension system, will now be described with reference to the accompanying drawings, in which:

Figure 1 is a side elevation partly in section of the liquid spring generally, but omitting details of the packing gland and low pressure reservoir; and Figure 2 is an enlarged sectional elevation showing the packing gland assembly and associated low pressure reservoir.

Referring to Figure 1, the device comprises a thick-walled high pressure cylinder 11 made of high tensile steel having at its closed end 12 an apertured lug 13 for pin jointed connection with the unsprung part of the vehicle. The cylinder may be filled with liquid through an inflation valve 14. At its open end the cylinder 11 is formed with an internal thread 15 and with a step 16 which receive a packing gland assembly indicated generally at 17 and an end cap 18. A plunger 19 which is hard chrome plated or of nitrided steel is reciprocable through the packing gland assembly 17 in sealing relation therewith, and its outer end terminates in an apertured lug 20 for pin jointed connection with the sprung part of the vehicle. A steel tube shroud 21 carried at the outer end of the plunger 19 is a good sliding fit around Phosphor bronze bushes 22 and 23 on the outer surface of the cylinder 11. The shroud 21 serves both as a dust excluder and as a means for assisting in guiding the plunger 19. An end plate 24 at the upper end of the shroud 21 includes filters 25 which act as breather valves for the air space 26. The air in the space 26 plays no part in the resilient nature of the device which is afforded solely by liquid completely filling the maximum available space inside the cylinder 11. In this example the liquid is that known in the United Kingdom under the specification DTD. 585 and in the United States as MIL-O-5606, but any suitable liquid may be used, one characteristic of suitability being that it is less viscous than the reservoir oil, described hereinafter. When external loads acting in compression cause the plunger 19 to move into the cylinder 11, the liquid filling the cylinder is compressed by the increasing plunger volume received within the cylinder. When the external loads are relieved, the restoring forces of the compressed liquid serve to force the plunger outward. Movement of the plunger, particularly outward or recoil movement, is preferably damped hydraulically, in known manner, and for this purpose the plunger 19 carries a damping head 27 which has a bronze bush 28 engaging the wall of the cylinder. The damping head 27 is formed with one or more through passages, of which one is indicated at 29, and movement of the plunger must result in liquid flowing through the one or more passages to pass from one side of the damping head to the other. Differential damping providing for greater damping during recoil than during compression may be provided by means of shuttle valves or the like, but since such provisions are known, and are shown in the patents referred to hereinbefore, they are not illustrated in the drawings.

The primary features of the invention reside in the formation of the packing gland assembly and its associated low pressure oil-containing reservoir for use in combination with the particular liquid spring type of resilient telescopic device described above. These primary features will now be described in detail with particular reference to Figure 2. The packing gland assembly 17 comprises a housing 30 in which is formed a stepped bore having a larger diameter portion 31 and a smaller diameter portion 32 as well as a bore 33 which has a small clearance around the plunger 19. The smaller diameter bore portion 32 receives a laminated packing comprising a relatively hard backing washer 34 made of processed leather material known under the trade name Protosil. Next come alternate layers of chamois leather and Protosil washers indicated at 35 and 36 respectively, the chamois leather washers being impregnated with a liquid polymer known under the trade name Thiokol. Next there is a non-metallic anti-extrusion washer 37 of material known under the trade name Teflon, and finally a steel washer 38 which has clearance around the plunger 19. A differential piston 39 has its larger diameter portion fitting the larger diameter bore portion 31 and its smaller diameter portion fitting the bore portion 32. The piston 39 is sealed at 40 and 41 in the bore portions 31 and 32 respectively, and has its larger end subjected to the pressure in the cylinder 11. The space between the steps in the bore and piston is vented along drillings 42 and 43 with an annular groove 44 on the outer end face of the housing. The differential piston 39 is prevented from leaving the housing by a retainer plate 45 which, together with the housing 30, is clamped against the step 16 in the cylinder 11 by the screw-threaded end cap 18. The housing 17 is statically sealed with respect to the cylinder 11 by a square section synthetic rubber ring 46.

The end cap 18 engages the outer end face of the housing 17 and, with the annular groove 44 in the housing, serves to define a low pressure reservoir. The reservoir is partly closed by a spring-loaded piston 47 operating in the bore 48 in the end cap. The end cap carries a filler nipple 49 so that a grease gun can be used to charge the reservoir with oil. A low pressure seal is provided between the end cap 18 and the plunger 19 by a synthetic rubber ring 50.

As a suitable oil for the reservoir for use with the DTD. 585 inside the high pressure chamber, a lubricating oil of the order of those classified in the United Kingdom and in the United States as S. A. E. 140 oils may be used. This S. A. E. 140 oil is more viscous than the DTD. 585 used within the cylinder 11. The spring-loaded piston 47 may be employed to maintain the oil against the part of the plunger 19 between the sealing ring 50 and the washer 34 of the packing gland assembly, although if the effect of gravity so maintains the external oil this piston 47 may be dispensed with.

For a vehicle of average weight, the liquid inside the cylinder 11 will be pressurised to say 7,000 lbs. per square inch, that is to say the liquid will have this pressure before the device is installed in the suspension system. After installation, when the device is serving in resisting its share of the downward load of the sprung part of the vehicle, the plunger 19 will assume a predetermined static position corresponding to the vehicle being at rest, and in this static condition the pressure in the liquid will have risen to say 11,000 lbs. per square inch. When the vehicle is travelling and the device is serving with others in resisting the loads resulting from undulations and irregularities in the surface on which the vehicle is travelling, the plunger 19 of each device will move in and out of the cylinder under the influence of the external loads and of the restoring force of the compressed entrapped liquid when these external loads are relieved momentarily. Reciprocation of the plunger will bring about a rise and fall in the liquid pressure between the minimum pressure of 7,000 lbs. per square inch and a maximum pressure of say 15,000 lbs. per square inch. The pressure of the lubricating oil in the low pressure reservoir may be atmospheric pressure or some slightly higher pressure. The presence in the low pressure reservoir of oil having a greater viscosity than the oil in the cylinder 11, taken in conjunction with the form of packing gland assembly described, will serve to preserve the surface of the plunger 19 whilst safeguarding against loss of liquid from inside the cylinder 11.

The drawings may be taken as being approximately to scale with the diameter of the plunger as three eighths of an inch. The piston 39 has a differential effect of approximately 12%, this having been found as a satisfactory amount.

The complete theory underlying this phenomenon is not at present known with certainty though various explanations can be put forward. Tests have shown that the phenomenon actually does occur if and when the conditions specified are maintained, but not otherwise, and indeed that the pressure inside the chamber can be caused to increase gradually over a large number of strokes, and that if the external oil be removed the seal begins to leak with consequent fall in pressure. Replacing the external oil, again causes pressure inside the chamber to increase gradually. Moreover, it has been shown that the colour of the oil in the high pressure chamber has been considerably changed by some of the external oil being carried into the chamber and dissolved in the thinner oil therein.

There are many factors which lead to the result achieved, and these include the viscosity of the external oil in relation to the viscosity of the liquid inside the chamber, the axial length of the packing gland, and the axial pressure to which the gland is subjected, which pressure is preferably in excess of that of the liquid in the chamber. By suitable selection, a seal can be obtained which will maintain substantially the same amount of liquid in the chamber without causing deterioration to the surface of the plunger.

Many months of experiments and tests disclosed glands which were found to act efficiently as a seal but which would soon break down and cause a deterioration to the surface of the plunger. Others which did not damage the plunger would be incapable of maintaining conditions inside of the cylinder. The particular construction above described maintains satisfactory conditions inside the high pressure cylinder without causing damage to the plunger, this despite many hundreds of thousands of reversals of the plunger.

Although the drawings show a low pressure reservoir of small extent, it will be understood that one or more liquid spring type resilient devices may, in accordance with the invention, be mounted within a common housing or sump which encloses the device or devices, and which by containing oil of suitable viscosity will constitute the low pressure reservoir.

We claim:

1. A liquid spring type resilient telescopic device comprising a chamber, a liquid of a given viscosity completely filling said chamber, a plunger movable into said chamber to compress the liquid therein and movable out of said chamber under the restoring force of the compressed liquid, said chamber being formed with a low pressure reservoir surrounding said plunger adjacent its exterior portion, a lubricating oil within said reservoir of a viscosity greater than the viscosity of the liquid within the chamber, and having access to the plunger for deposit thereon, said chamber being also formed with a bore extending longitudinally of and surrounding the plunger, interiorly of and open at its exterior end to the reservoir, and open at its interior end to the liquid-filled chamber, packing and sealing material filling at least the exterior portion of said bore and closely embracing the plunger, and means bearing upon the interior end of said packing material, and located where it is subject to pressures within the chamber, said means being movable under the influence of such pressures as they vary, to exert an increasing pressure upon the packing material comformably to increase of pressure within the chamber.

2. A liquid spring type resilient telescopic device as in claim 1, characterized in that the pressure-exerting means includes a pressure-intensifying device located where it is subject to pressures within the chamber, to augment the pressure upon the packing material to a value always in excess of the instantaneous pressure within the chamber.

3. A liquid spring type resilient telescopic device as in claim 2, wherein the bore is stepped and the packing material is disposed at the smaller end thereof, and the pressure-intensifier device comprises a stepped piston slidably mounted in said stepped bore, sealing means effective between the piston and bore at remote sides of both steps, and a vent opening from the space formed between said steps, the larger end of the piston being exposed to chamber pressure and the smaller end abutting said packing material.

4. A liquid spring type resilient telescopic device as in claim 2, wherein the packing material comprises alternate layers of relatively hard and soft leather composition washers.

5. A liquid spring type resilient telescopic device as in claim 4, wherein an anti-extrusion washer of non-metallic material is interposed between the pile of leather composition washers and the pressure-intensifier device.

6. A liquid spring type resilient telescopic device comprising a liquid-filled high pressure chamber; a plunger movable into said chamber to compress the liquid therein and movable out of said chamber under the restoring force of the compressed liquid; a packing gland assembly sealing the plunger with respect to said chamber, said packing gland assembly having packing material built up of alternate layers of relatively hard and soft leather composition washers, and said assembly including a pressure-intensifier device consisting of a stepped bore with the packing material disposed at the base of the bore, a stepped piston slidably mounted in said stepped bore, sealing means effective between the piston and bore at remote sides of both steps, and a vent opening from the space formed between said steps, the larger end of the piston being exposed to chamber pressure and the smaller end abutting said packing material to induce in the latter a pressure greater than that of the liquid in the high pressure chamber; a low pressure reservoir surrounding said plunger adjacent the outer side of the packing gland assembly; said reservoir having a closure member including spring-loaded piston means compensating for volumetric changes in said reservoir; and lubricating oil in said reservoir, said lubricating oil having a viscosity greater than that of the liquid in the high pressure chamber whereby said plunger is adapted during reciprocation to convey minute quantities of lubricating oil from the low pressure reservoir into the high pressure chamber.

7. In a liquid spring, in combination, a cylinder, a liquid of selected viscosity completely filling all available space within said cylinder, a plunger movable under the influence of an external force into the cylinder to compress the liquid therein and outwardly of the cylinder by reaction from the compressed liquid, and a liquid seal carried by the cylinder surrounding the plunger, said seal including a housing chambered to define a bore surrounding and extending lengthwise of the plunger, a mass of deformable material received within and filling said bore and closely embracing the plunger, said housing being further chambered to define a closed, low-pressure reservoir surrounding the plunger and communicating with the mass of deformable material, at the exterior end of said bore, a liquid within said reservoir of viscosity greater than the viscosity of the liquid within the cylinder, a pressure-transmitting element slidably received in said bore, surrounding the plunger and bearing upon the interior end of said mass of deformable material, and means exposed to and sensitive to instantaneous pressures within said cylinder, and operatively connected to said pressure-transmitting element for augmentation of such instantaneous pressures, to urge the pressure-transmitting element against the mass of deformable maerial to deform such mass, with a pressure always in excess of the instantaneous pressure upon the liquid within the cylinder.

8. In a liquid spring, in combination, a cylinder, a liquid of selected viscosity completely filling said cylinder, a plunger movable under the influence of an external force into the cylinder to compress the liquid therein and outwardly of the cylinder by reaction from the compressed liquid, and a liquid seal carried by the cylinder surrounding the plunger, said seal including a housing chambered to define a bore surrounding and extending lengthwise of the plunger, sealing washers of deformable material received within and filling said bore and closely embracing the plunger, said housing being further chambered to define a closed, low-pressure reservoir surrounding the plunger and communicating with the sealing washers, at their exterior end, a liquid within said reservoir of viscosity greater than the viscosity of the liquid within the cylinder, and a piston surrounding the plunger and having a smaller inner end bearing upon the interior end of the sealing washers and having a larger inner end which is exposed to the pressures within the cylinder, to transmit a unit pressure to the sealing washers which is always higher than the coincident unit pressure on the liquid within the cylinder, and by the reformation of the sealing washers thus induced urging them strongly against the plunger.

9. A liquid seal for use in a liquid spring of the type wherein a plunger moves inwardly of a closed cylinder completely filled with a liquid of given viscosity, to compress such liquid, and is moved outwardly of the cylinder by the reaction of the compressed liquid, such seal serving to seal the plunger from the cylinder, and comprising, in combination, a housing chambered to define a bore surrounding and extending lengthwise of the plunger, a mass of deformable material received within and filling said bore, and closely embracing the plunger, said housing being further chambered to define a closed, low-pressure reservoir surrounding the plunger and communicating with said mass of deformable material at the exterior end of said bore, a liquid within said reservoir of viscosity greater than the viscosity of the liquid within the cylinder, a pressure-transmitting element slidably received in said bore, surrounding the plunger and bearing upon the interior end of said mass of deformable material, and means which in use is exposed to instantaneous pressures within said cylinder and operatively connected to said pressure-transmitting element for augmentation of such instantaneous pressures, to urge the pressure-transmitting element against the mass of deformable material, to deform such mass, with a pressure always in excess of the instantaneous pressure upon the liquid within the cylinder.

10. A liquid seal as defined in and for the purpose indicated in claim 9, wherein the pressure-transmitting element and the means which is exposed to cylinder pressures are combined in the form of a stepped piston surrounding the interior portion of the plunger and slidably mounted in the interior end of the bore, with its smaller end bearing upon the interior end of the mass of deformable material and its larger end exposed to pressures within the cylinder.

11. A liquid seal as defined in and for the purpose indicated in claim 10, wherein the housing is formed with a passage interconnecting the low-pressure reservoir and the space within the bore beneath the piston's step.

12. A liquid seal as defined in and for the purpose indicated in claim 9, wherein the mass of deformable material is formed as a stack of washers, wherein washers of deformable material are interspersed with washers of relatively non-deformable material.

13. A liquid seal as defined in and for the purpose indicated in claim 9, including a spring-loaded piston means urged into said reservoir to compensate for volumetric changes in the latter.

COLIN M. FRYE.
FREDERICK E. KILLNER.
ARTHUR K. MORRIS.

References Cited in the file of this patent

UNITED STATES PATENTS

| Number | Name | Date |
|---|---|---|
| 1,996,779 | Wheeler | Apr. 9, 1935 |
| 2,071,701 | Mejean | Feb. 23, 1937 |
| 2,155,628 | Williams | Apr. 25, 1939 |
| 2,581,856 | Gruss | Jan. 8, 1952 |